United States Patent
Taneja et al.

(10) Patent No.: US 12,524,525 B1
(45) Date of Patent: Jan. 13, 2026

(54) SYSTEM AND METHOD FOR SECURING SOFTWARE APPLICATION BASED MICROSERVICES ARCHITECTURES

(71) Applicant: Bank of America Corporation, Charlotte, NC (US)

(72) Inventors: Pushkar Taneja, Hyderabad (IN); Suryanarayana Adivi, Hyderabad (IN); Jemlin Lucas, Coppell, TX (US)

(73) Assignee: Bank of America Corporation, Charlotte, NC (US)

( * ) Notice: Subject to any disclaimer, the term of this patent is extended or adjusted under 35 U.S.C. 154(b) by 29 days.

(21) Appl. No.: 18/750,331

(22) Filed: Jun. 21, 2024

(51) Int. Cl.
*G06F 21/54* (2013.01)
*G06F 21/55* (2013.01)

(52) U.S. Cl.
CPC ............ *G06F 21/54* (2013.01); *G06F 21/552* (2013.01)

(58) Field of Classification Search
CPC ................................. G06F 21/54; G06F 21/552
See application file for complete search history.

(56) References Cited

U.S. PATENT DOCUMENTS

| | | | |
|---|---|---|---|
| 10,673,708 B2 | 6/2020 | Parthasarathy et al. | |
| 10,713,664 B1 | 7/2020 | Alagappan et al. | |
| 10,756,982 B2 | 8/2020 | Bai | |
| 10,921,675 B2 | 2/2021 | Barnum et al. | |
| 11,093,216 B2 | 8/2021 | Sasidharan et al. | |
| 11,282,013 B2 | 3/2022 | Rana et al. | |
| 11,397,630 B2 | 7/2022 | Dutta et al. | |
| 11,593,084 B2 | 2/2023 | Dinh et al. | |
| 11,599,393 B2 | 3/2023 | Gebara et al. | |
| 11,635,995 B2 | 4/2023 | Bahl et al. | |
| 11,797,272 B2 | 10/2023 | Makhija et al. | |
| 11,870,669 B2 | 1/2024 | Poornachandran et al. | |
| 11,940,904 B2 | 3/2024 | Xiao et al. | |
| 11,948,128 B2 | 4/2024 | Kesiboyana et al. | |
| 12,399,768 B1 * | 8/2025 | Saha | G06F 11/079 |
| 12,406,242 B2 * | 9/2025 | Cella | G06Q 10/06311 |
| 12,407,702 B1 * | 9/2025 | de Wet | H04L 43/06 |
| 2020/0193221 A1 | 6/2020 | Aftab et al. | |
| 2020/0257566 A1 | 8/2020 | Ganguli et al. | |
| 2020/0287923 A1 | 9/2020 | Raghavendra et al. | |
| 2022/0108147 A1 | 4/2022 | Wan et al. | |
| 2023/0134078 A1 | 5/2023 | Aftab et al. | |

(Continued)

*Primary Examiner* — Stephen T Gundry (57) ABSTRACT

A system includes a memory configured to store a software application and a plurality of microservices including a set of independent software service components configured to be independently executed. The system includes processors operably coupled to the memory and configured to receive a request to initiate an execution of interactions with the software application for satisfying the request, and to identify, based on the request, one or more microservices to be executed to initiate the execution of the interactions with the software application. The processors further execute one or more generative machine-learning models trained to identify anomalous interservice interaction patterns between the one or more microservices. In response to identifying the anomalous interservice interaction patterns, the processors dynamically update operations processes associated with the one or more microservices, and further execute the one or more microservices to initiate the execution of the one or more interactions with the software application.

20 Claims, 3 Drawing Sheets

(56) References Cited

U.S. PATENT DOCUMENTS

| | | | |
|---|---|---|---|
| 2025/0258465 A1* | 8/2025 | Pan | G05B 13/042 |
| 2025/0258708 A1* | 8/2025 | Crabtree | G06F 9/5027 |
| 2025/0258788 A1* | 8/2025 | Mishra | G06F 13/22 |
| 2025/0259144 A1* | 8/2025 | Crabtree | G06Q 30/0201 |
| 2025/0265585 A1* | 8/2025 | Bansal | G06F 16/27 |
| 2025/0272299 A1* | 8/2025 | El Hatami | G06F 16/24575 |
| 2025/0272652 A1* | 8/2025 | Makhija | G06F 40/205 |
| 2025/0272681 A1* | 8/2025 | Bansal | G06Q 20/401 |

* cited by examiner

SYSTEM AND METHOD FOR SECURING SOFTWARE APPLICATION BASED MICROSERVICES ARCHITECTURES

TECHNICAL FIELD

The present disclosure relates generally to computing security, and, more specifically, to a system and method for securing software application based microservices architectures.

BACKGROUND

Certain web-based environments may include data stored across any number of databases and associated with any number of entities. For example, the data may include various user data or service data that may be stored to databases associated with respective entities, and that user data or service data may be accessed by any number of centralized or decentralized servers for servicing applications associated with various users. However, such web-based environments may be sometimes subjected to various threats and cyberattacks.

SUMMARY

The system and methods implemented by the system as disclosed in the present disclosure provide technical solutions to the technical problems discussed above by providing systems and methods for securing and optimizing software application based microservices architectures. The disclosed system and methods provide several practical applications and technical advantages. For example, by microservices architectures including decentralized software components and services as compared to the centralized software component and service that may be associated with a monolithic software application, microservices architectures may often precipitate network congestion, network latency, version incompatibility, data integrity, or other similar issues that may adversely impact operations processes of the microservices architecture.

Accordingly, the present embodiments improve the security, reliability, maintainability, and responsiveness of microservices architectures, microservices applications, and sensitive user data, as well as the one or more processors and memory on which the microservices architectures, microservices applications, and sensitive user data may be executed and stored by providing an intelligent microservices architecture and system that utilizes one or more generative machine-learning models (e.g., generative artificial intelligence (AI) models) trained and executed to identify anomalous interservice interaction patterns between different microservices and dynamically update operations processes associated with the different microservices based thereon.

That is, the intelligent microservices architecture and system may intelligently orchestrate, manage, and control interactions between microservices by identifying anomalous interservice interaction patterns between different microservices and dynamically updating operations processes (e.g., one or more of a microservices security operations process, a dynamic version control operations process, a dynamic network routing operations process, a patch execution and self-healing operations process, or a system fault routing operations process) associated with the different microservices as appropriate. In this way, the present embodiments reduce execution time, latency, and processing workloads of processors hosting microservices architectures, increase microservices architecture security, and increase network efficiency by enhancing interservice interactions and reducing the potential for version incompatibility and system faults.

The present embodiments are directed to systems and methods for securing and optimizing software application based microservices architectures. In particular embodiments, a memory may be configured to store a software application and a plurality of microservices associated with the software application. In one embodiment, the plurality of microservices may include a set of independent software service components of the software application configured to be independently executed. In particular embodiments, one or more processors operably coupled to the memory may be configured to receive, from a computing device, a request to initiate an execution of one or more interactions with the software application for satisfying the request.

In particular embodiments, the one or more processors may be further configured to identify, based at least in part on the request, one or more microservices of the plurality of microservices to be executed to initiate the execution of the one or more interactions with the software application for satisfying the request. For example, in particular embodiments, the plurality of microservices may include an authentication service, a tracing service, a monitoring service, a logging service, user profile service, a trading service, a data synchronization service, a backup service, a configuration service, a notification service, a reconciliation service, a reporting service, an interaction execution service, technical support service, and a third-party application programming interface (API) service.

In particular embodiments, the one or more processors may be further configured to execute one or more generative machine-learning models trained to identify one or more anomalous interservice interaction patterns between the one or more microservices based at least in part on the identified one or more microservices. For example, in particular embodiments, the one or more processors may be configured to execute the one or more generative machine-learning models trained to identify one or more anomalous interservice interaction patterns between each of the plurality of microservices. In one embodiment, the one or more anomalous interservice interaction patterns may include one or more of an anomalous interservice communication pattern, an anomalous interservice versioning pattern, an anomalous interservice network latency pattern, an anomalous interservice data integrity pattern, an anomalous interservice logging pattern, an anomalous interservice dependency pattern, or an anomalous interservice fault isolation pattern.

In particular embodiments, the one or more generative machine-learning model may include one or more of a language model (LM), a large language model (LLM), a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, or a generative pre-10 trained transformer (GPT) model. In particular embodiments, in response to identifying the one or more anomalous interservice interaction patterns between the one or more microservices, the one or more processors may be further configured to dynamically update one or more operations processes associated with the one or more microservices.

For example, in particular embodiments, the one or more processors may be configured to dynamically update the one or more operations processes by dynamically updating one or more of a microservices security operations process, a dynamic version control operations process, a dynamic network routing operations process, a patch execution and self-healing operations process, or a system fault routing operations process. In particular embodiments, the one or more processors may be further configured to execute, based at least in part on the dynamically updated one or more operations processes, the one or more microservices to initiate the execution of the one or more interactions with the software application for satisfying the request. For example, in one embodiment, the one or more processors may be configured to execute the one or more microservices to initiate the execution of the one or more interactions with the software application to execute a predetermined action for satisfying the request.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
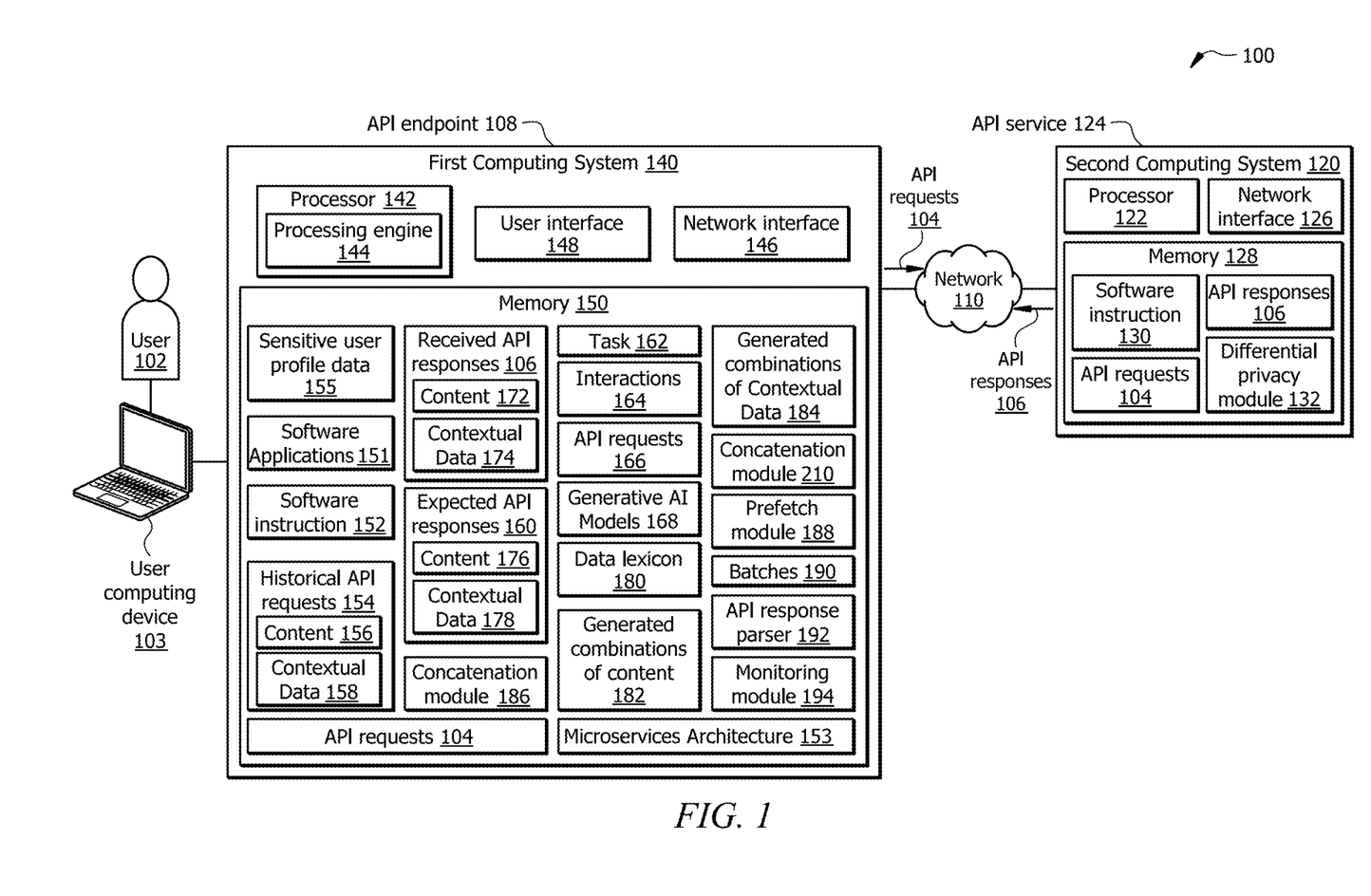
FIG. 1 is a block diagram of a system of a server and host computing system and network, in accordance with certain aspects of the present disclosure.

FIG. 1 is a block diagram of a computing system and network 100 that is configured to secure and optimize software application 151 based microservices architectures 153, API services 124, API responses 106, and/or one or more system components, such as one or more of the user computing device 103, processor 142, the processing engine 144, the user interface 148, and the network interface 146 that may be associated with the execution of respective software applications 151. In one embodiment, the computing system and network 100 may include a first computing system 140. In some embodiments, the computing system and network 100 further may include a user 102, the user computing device 103, a network 110, and a second computing system 120.

In particular embodiments, the user 102 may be representative of any number of users associated with an institution, an organization, or an entity that has instantiated respective user profiles on the first computing system 140, and may be thus associated with sensitive user profile data 155. The sensitive user profile data 155 that may be associated with one or more of a large number of users internal or external to the institution, the organization, or the entity. The network 110 enables communications among components of the computing system and network 100. In other embodiments, the computing system and network 100 may not have all of the components listed and/or may have other elements instead of, or in addition to, those listed above.

In particular embodiments, the first computing system 140 may include a processor 142 in signal communication with a memory 150. The memory 150 stores software instructions 152 that when executed by the processor 142, cause the processor 142 to perform one or more functions described herein. For example, when the software instructions 152 are executed, the processor 142 executes a processing engine 144 to access a set of application environment parameters associated with a particular software application 151 of the number of respective software applications 151, in which the set of application environment parameters is associated with a current configuration of the particular software application 151 and the system components, such as one or more of the user computing device 103, processor 142, the processing engine 144, the user interface 148, and the network interface 146 that may be associated with the execution of respective software applications 151.

The processor 142 further identifies, based on the set of application environment parameters, a number of potential threats and vulnerabilities associated with an execution of the particular software application 151 in accordance with the current configuration. The processors 142 further executes one or more execute one or more generative machine-learning models 168 trained to generate a prediction of one or more cyber threat scenarios based on the set of application environment parameters and the number of potential threats and vulnerabilities, in which the prediction of the one or more cyber threat scenarios includes cyber threat scenarios specific to the particular software application 151. The processor 142 further outputs, by the one or more generative machine-learning models 168, the prediction of the one or more cyber threat scenarios.

In particular embodiments, the software instructions 152 when further executed by the processor 142, cause the processor 142 to perform one or more additional functions described herein. For example, when the software instructions 152 are executed, the processor 142 executes a processing engine 144 to access one or more cyber threat scenarios associated with a particular software application 151 of a number of respective software applications 151, the one or more cyber threat scenarios is specific to the particular software application 151.

The processor 142 further identifies, based on the one or more cyber threat scenarios, an actual cyber threat associated with an execution of the particular software application 151 in accordance with the current configuration. The processors 142 further executes a dynamic remote based isolation (RBI) engine configured to perform a dynamic reconfiguration of the particular software application 151 and the system components in response to the identified actual cyber threat. The dynamic reconfiguration may be different from the current configuration of the software application 151 and the system components. The processor 142 further cause the particular software application 151 to be executed in accordance with the dynamic reconfiguration of the particular software application 151 and the system components.

The computing system and network 100 may be configured as shown, or in any other configuration. In accordance with the presently disclosed embodiments, the first computing system 140 may be suitable for securing user data against internal cyber threats. In one embodiment, the first computing system 140 may include a centralized or decentralized server of an institution or organization suitable for hosting and servicing a large number of external users, as well as internal users, such as the user 102 while utilizing the user computing device 103. Similarly, the second computing system 120 may include third-party server or service that may be communicatively coupled to the first computing system 140 by way of the network 110.

System Components

Network

The network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Second Computing System

In particular embodiments, the second computing system 120 is generally a computing device that is configured to process data and communicate with computing devices (e.g., the first computing system 140), databases, systems, etc., via the network 110 and may be associated with a second entity separate from the first entity in accordance with the presently disclosed embodiments. The second computing system 120 is generally configured to generate API responses 106 in response to receiving the API requests 104 and/or API requests 166. In particular embodiments, the second computing system 120 may include a processor 122 in signal communication with a network interface 126 and a memory 128. Memory 128 stores software instructions 130 that when executed by the processor 122, cause the second computing system 120 to perform one or more functions described herein. For example, when the software instructions 130 are executed, the second computing system 120 generates API responses 106 in response to receiving the API requests 104. The second computing system 120 may be configured as shown, or in any other configuration.

The processor 122 may include one or more processors operably coupled to the memory 128. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the network interface 126 and memory 128. The one or more processors are configured to process data and may be implemented in hardware or software.

For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 130 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

The network interface 126 is configured to enable wired and/or wireless communications (e.g., via the network 110). The network interface 126 is configured to communicate data between the second computing system 120 and other network devices, systems, or domain(s). For example, the network interface 126 may comprise a WIFI interface, a local area network (LAN) interface, a wide area network (WAN) interface, a modem, a switch, or a router. The processor 122 is configured to send and receive data using the network interface 126. The network interface 126 may be configured to use any suitable type of communication protocol.

The memory 128 may be volatile or non-volatile and may comprise a read-only memory (ROM), random-access memory (RAM), ternary content-addressable memory (TCAM), dynamic random-access memory (DRAM), and static random-access memory (SRAM), or other non-transitory computer-readable medium. Memory 128 may be implemented using one or more disks, tape drives, solid-state drives, and/or the like. Memory 128 is operable to store the software instructions 130, API requests 104, API responses 106, differential privacy module 132, and/or any other data or instructions. The software instructions 130 may comprise any suitable set of instructions, logic, rules, or code operable to execute the processor 122.

The memory 128 may also store a second user data set 131 that may be associated with the second entity to which the second computing system 120 is associated. For example, in some embodiments, the second entity may include a second user profile configured to facilitate user interactions between the user 102 and a number of other users associated with the second entity, and thus the second user data set 131 may include any data associated with the user 102 and servicing and facilitating user interactions between the user 102 and a number of other users associated with the second entity and the second computing system 120.

First Computing System

In particular embodiments, the first computing system 140 is generally any computing device that is configured to process data and communicate with computing devices (e.g., second computing system 120), databases, systems, etc., via the network 110. The first computing system 140 is generally configured to oversee operations of the processing engine 144. The first computing system 140 is associated with an API endpoint 108 where API requests 104 are originated. In particular embodiments, the first computing system 140 may include the processor 142 in signal communication with a network interface 146, a user interface 148, and memory 150. The first computing system 140 may be configured as shown, or in any other configuration.

The processor 142 may include one or more processors operably coupled to the memory 150. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 142 may be a programmable logic device, a microcontroller, a microprocessor, or any suitable combination of the preceding. The processor 142 is communicatively coupled to and in signal communication with the network interface 146, user interface 148, and memory 150. The one or more processors are configured to process data and may be implemented in hardware or software.

For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 152 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

The network interface 146 is configured to enable wired and/or wireless communications (e.g., via the network 110). The network interface 146 is configured to communicate data between the first computing system 140 and other network devices, systems, or domain(s). For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol.

The memory 150 may be volatile or non-volatile and may include a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 150 is operable to store the software instructions 152, historical API requests 154, API requests 104, concatenation module 186, prefetch module 188, received PAI responses 106, expected API responses 160, generated combinations of content 182, generated combination of contextual data 184, API requests 166, one or more generative machine-learning models 168, task 162, interactions 164, data lexicon 180, batches 190, API response parser 192, monitoring module 194, and/or any other data or instructions. The software instructions 152 may include any suitable set of instructions, logic, rules, or code operable to execute the processor 142.

The memory 150 may also store instances of a software application 151 that may be executing within the computing system and network 100. In one embodiment, the instances of a software application 151 may include any number of instances a large software application suitable for hosting and servicing millions or billions of individual users and that may also interact via API requests 104 and API responses 106 with the computing system 120.

Processing Engine

Processing engine 144 may be implemented by the processor 142 executing the software instructions 152, and is generally configured for securing software application based microservices architectures 153. The processing engine 144 may be implemented by the processor 142 executing the software instructions 152, and may be further generally configured for securing software application based microservices architectures 153. The processing engine 144 accesses historical API requests 154. The processing engine 144 generates one or more API requests 104 based on content 156 and contextual data 158 associated with the historical API requests 154. The processing engine 144 sends the API requests 104 to the second computing system 120. The second computing system 120 generates API responses 106 to the received API requests 104. The second computing system 120 sends the API responses 106 to the first computing system 140.

The processing engine 144 parses the API responses 106 and detects content 172 and contextual data 174 associated with the API responses 106. The processing engine 144 compares each received API responses 106 with a counterpart expected API response 160, where each received API responses 106 and the counterpart expected API response 160 is associated with the same API requests 104 and/or task 162, such as generating a user account number.

The processing engine 144 determines whether a received API responses 106 corresponds with its counterpart expected API response 160. If the processing engine 144 determines that the received API responses 106 does not correspond with the counterpart expected API response 160, the processing engine 144 identifies the difference between the received API responses 106 and the counterpart expected API response 160. In other words, the processing engine 144 identifies interactions 164 made to the received API responses 106, where the interactions 164 is made to the received API responses 106 by the second computing system 120. In response, the processing engine 144 may update future API requests 166 associated with the particular task 162 according to the interactions 164 made to the received API responses 106.

In particular embodiments, the processing engine 144 may be utilized to securing and optimizing software application based microservices architectures 153. In this process, the processing engine 144 may execute the one or more generative machine-learning models 168, such as one or more of a language model (LM), a large language model (LLM), one or more transformer-based machine-learning models, one or more sequence-to-sequence (Seq2Sec) models, or other similar generative machine-learning models 168 that may be trained and executed to identify anomalous interservice interaction patterns between different microservices of the microservices architectures 153 and dynamically update operations processes associated with the different microservices of the microservices architectures 153 based thereon.

In particular embodiments, the microservices architecture 153 may include a number of autonomous and independently executed services, in which each service or microservice of the microservices architecture 153 may be self-contained and configured to implement one or more predetermined functions for satisfying user requests. For example, the microservices of the microservices architecture 153 may include small, independent, and loosely coupled microservices with separate codebases that may be developed and maintained by a small team of developers, for example. In particular embodiments, the microservices of the microservices architecture 153 may each persist its own data and may each efficiently communicate with other microservices of the microservices architecture 153 by using, for example, lightweight and well-defined application programming interfaces (APIs).

Generating Combinations of Content and Contextual Data

The operational flow may begin at a training generation step where the processing engine 144 accesses the historical API requests 154, e.g., stored in the memory 150.

Each historical API request 154 may include content 156 and contextual data 158. For example, the content 156 associated with a historical API request 154 may include the data that is requested in the historical API request 154. In an example historical API request 154 that requests to generate a user account number for a user, the content 156 may include a name, a unique identifier number, phone number, address, user account number, and/or the like. The contextual data 158 associated with a historical API request 154 may include one or more a header, a trailer, an URL, a data format associated with the content 156, and/or the like.

The processing engine 144 identifies the content 156 and the contextual data 158 associated with the historical API requests 154. The processing engine 144 uses this information to generate the API requests 104. One reason for generating API requests 104 is to generate different combinations or different possibilities of content 182 and contextual data 184. Each combination of content 182 and contextual data 184 corresponds to one API requests 104. In this manner, the processing engine 144 is able to detect any interactions 164 made to any aspect of the process of generating API responses 106 compared to expected API responses 160.

In one embodiment, the processing engine 144 may implement a random data generator for generating combinations of content 182 and combinations of contextual data 184. The processing engine 144 may vary the content 156 and the contextual data 158 among one or more API requests 104. In the example of an API request 104 for generating a user account number for a user, to generate the combinations of content 182, the processing engine 144 may vary different data fields of the content 156, such as names, addresses, phone numbers, use account numbers, number of digits used in the user account numbers, etc. associated with the historical API requests 154. In the example of an API requests 104 for generating a user account number for a user, to generate the combinations of contextual data 184, the processing engine 144 may vary different data fields of the contextual data 158, such as headers, trailers, URLs, data formats, etc. associated with the historical API requests 154.

In some cases, a data field in content 182 and/or in contextual data 158 may not be generated synthetically and/or randomly. For example, zip codes associated with addresses (in content 156) may be predefined and not generated synthetically and/or randomly. In another example, names of cities associated with addresses (in content 156) may be predefined and not generated synthetically and/or randomly. In another example, the data format in contextual data 158 may be predefined and not generated synthetically and/or randomly. In such cases, the processing engine 144 may search in the data lexicon 180 that includes data that is predefined and/or not generated synthetically and/or randomly. The processing engine 144 may fetch such data from the data lexicon 180 and use it in the various combinations of content 182 and various combinations of contextual data 184.

Generating API Requests

At the execution operation, the processing engine 144 feeds the generated combinations of content 182 and combinations of contextual data 184 to the concatenation module 186.

The concatenation module 186 may be implemented by the processor 142 executing the software instructions 152, and further is generally configured to generate the API requests 104. In this process, the concatenation module 186 may concatenate each generated content 182 with each generated contextual data 184. Each combination of generated content 182 with a generated contextual data 184 may represent one of the API requests 104. The concatenation module 186 may feed the API requests 104 to the prefetch module 188.

The prefetch module 188 may be implemented by the processor 142 executing the software instructions 152, and further is generally configured to place the API requests 104 in batches 190. Each batch 190 may include fifty, one-hundred, or any other number of API requests 104. API requests 104 in each batch 190 may be associated with a particular one of the API services 124, e.g., generating user account numbers, etc.

The prefetch module 188 may determine whether the API requests 104 are compatible with the API services 124 of the destination second computing system 120, so that no error message is expected to be received from the second computing system 120. If the prefetch module 188 determines that the API requests 104 (in a first batch 190) are valid and compatible with the desired API service of the API services 124, the prefetch module 188 communicates the API requests 104 (in a first batch 190) to the second computing system 120.

In one embodiment, while the second computing system 120 is processing the API requests 104 (in the first batch 190), the prefetch module 188 may prefetch and prepare the next batch 190 of API requests 104 to send to the second computing system 120. The prefetch module 188 may continue this process for the next batches 190.

Generating API Responses

The second computing system 120 receives the API requests 104 at the differential privacy module 132. The differential privacy module 132 may be implemented by the processor 122 executing the software instructions 130, and further is generally configured to determine whether each of the API requests 104 is valid.

In one embodiment, the differential privacy module 132 may determine whether an API requests 104 is valid by determining whether it has originated from a pre-authenticated endpoint. If the differential privacy module 132 determines that an API request 104 is valid, it sends the API requests 104 to the processor 122 for processing. Otherwise, in one embodiment, the differential privacy module 132 may not forward the API requests 104 to the processor 122. In another embodiment, the differential privacy module 132 may return an error message to an originator of the invalid API requests 104. Thus, if the API requests 104 is determined to be invalid, the second computing system 120 may not generate an API response for it.

In this manner, the computing system and network 100 of FIG. 1 may be integrated into a practical application of improving information security and data loss prevention. For example, a bad actor may attempt to gain unauthorized access to the second computing system 120 by sending an API request 104. By detecting that the API requests 104 is invalid, data stored in the second computing system 120 may be kept secure from unauthorized access.

The processor 122 receives the validated API requests 104 and process them. The processor 122 generates an API responses 106 for each validated API requests 104. For example, if the API requests 104 includes a request to generate a user account number, the API responses 106 to this API requests 104 includes the generated user account number. The processor 122 communicates the API responses 106 to the differential privacy module 132.

Receiving API Responses

The differential privacy module 132 communicates the API responses 106 to the prefetch module 188. The prefetch module 188 may be implemented by the processor 142 executing the software instruction 152, and further is generally configured to parse each API responses 106. In one embodiment, the prefetch module 188 implemented a text parsing algorithm, such as natural language processing. In one embodiment, the prefetch module 188 may implement object-oriented programming and treat each data field in the API responses 106 as an object. The prefetch module 188 may include a content parser and a contextual data parser. The content parser may parse the contents 172 of the API responses 106. The contextual data parser may parse the contextual data 174 of the API responses 106. The prefetch module 188 forwards the content 172 and contextual data 174 to the monitoring module 194.

Securing and Optimizing Software Application Based Microservices Architectures

Embodiments of the present disclosure discuss techniques for securing and optimizing software application based microservices architectures.

Figure 2:
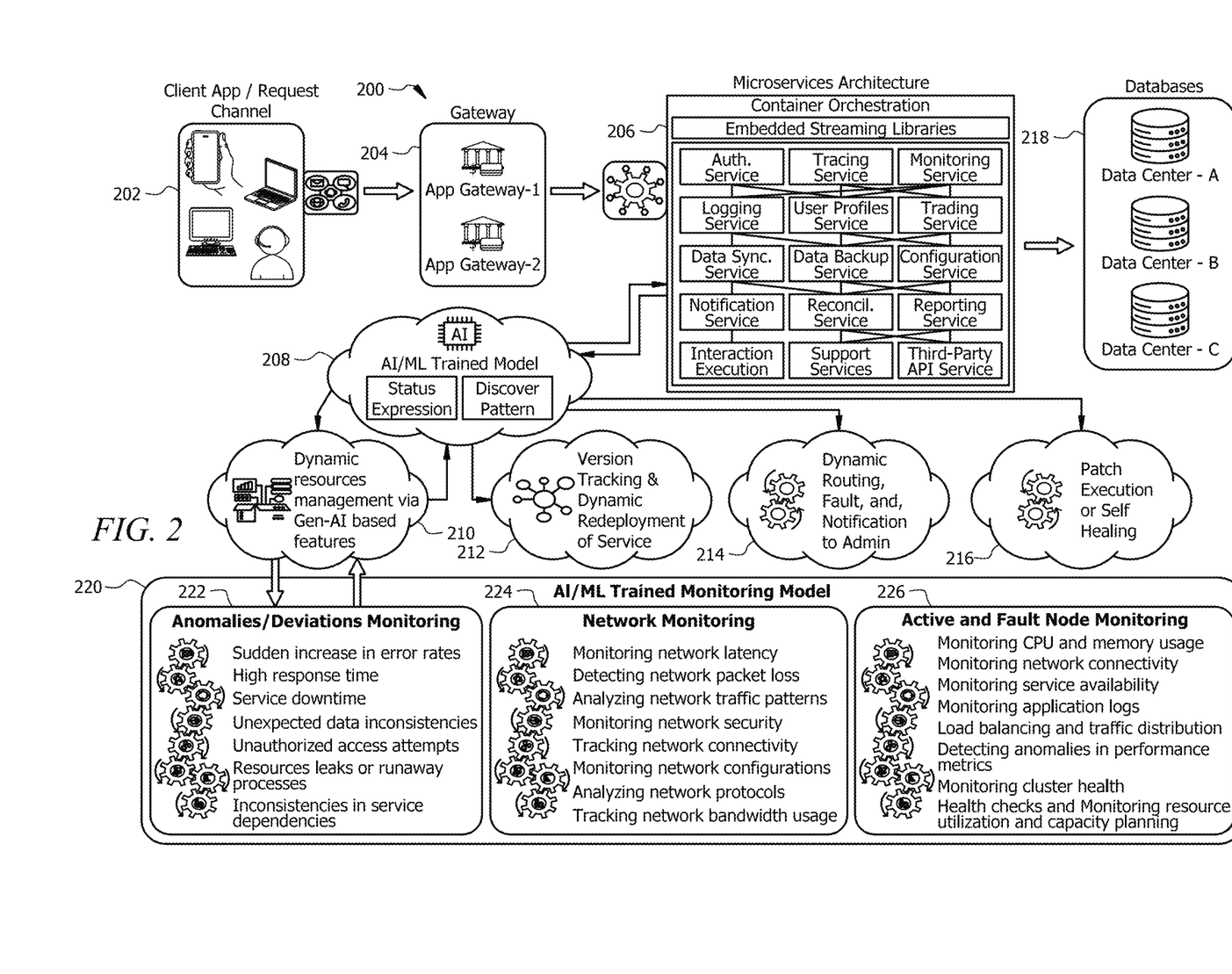
FIG. 2 illustrates a workflow diagram of an embodiment of an intelligent microservices architecture and system for securing software application based microservices architectures, in accordance with one or more embodiments of the present disclosure.

FIG. 2 illustrates a workflow diagram of an embodiment of an intelligent microservices architecture and system 200 for securing and optimizing software application based microservices architectures, in accordance with certain aspects of the present disclosure. In particular embodiments, the workflow of intelligent microservices architecture and system 200 may be performed utilizing the first computing system 140 as described above with respect to FIG. 1. As depicted, the workflow of the intelligent microservices architecture and system 200 may begin with receiving from the computing device 103 one or more client requests 202 to initiate an execution of one or more interactions with the software application 151 for satisfying the one or more client requests 202.

For example, in one embodiment, the one or more client requests 202 may be received by one or more gateways 204 (e.g., API gateways), which may each include any API gateway that may be suitable for serving as an entry point for client requests 202. Specifically, instead of the computing device 103 communicating directly with the microservices of the microservices architecture 206, the one or more gateways 204 (e.g., API gateways) may identify one or more microservices of a number of microservices of the microservices architecture 206 suitable for satisfying the one or more client requests 202. The one or more gateways 204 (e.g., API gateways) may then call the identified microservices and route the one or more client requests 202 to the identified microservices for satisfying the one or more client requests 202.

In particular embodiments, the number of microservices of the microservices architecture 206 may include, for example, an authentication service, a tracing service, a monitoring service, a logging service, user profile service, a trading service, a data synchronization service, a backup service, a configuration service, a notification service, a reconciliation service, a reporting service, an interaction execution service, technical support service, a third-party application programming interface (API) service, or other self-contained service that may be a part of the microservices architecture 206 and deployed, tested, executed, and maintained independently or quasi-independently of each other service of the microservices architecture 206.

In particular embodiments, as further depicted by FIG. 2, the microservices architecture 206 may be stored to one or more relational databases 218. For example, in one embodiment, each of the number of microservices of the microservices architecture 206 may be stored to a single relational database 218. In another embodiment, the number of microservices of the microservices architecture 206 may be stored across multiple relational databases 218, which may be each physically located in different geographical regions. For example, as depicted in FIG. 2, the multiple relational databases 218 may be physically located across a data center "A" in a first geographical region, a data center "B" in a second geographical region, and a data center "C" in a third geographical region, in which each of the first geographical region, the second geographical region, and the third geographical region may be remote from each other.

In particular embodiments, the workflow of the intelligent microservices architecture and system 200 may continue with executing one or more generative machine-learning models 208 trained to identify one or more anomalous interservice interaction patterns between the one or more microservices identified for satisfying the one or more client requests 202 and/or between each of the number of microservices of the microservices architecture 206. As depicted by FIG. 2, in particular embodiments, the one or more generative machine-learning models 208 may be executed in conjunction with one or more other generative machine-learning models 220. Specifically, in some embodiments, the one or more generative machine-learning models 208 may be trained and executed to dynamically update one or more of a microservices security operations process 210, a dynamic version control operations process 212, a dynamic network routing and fault rerouting operations process 214, and a patch execution and self-healing operations process 216 in response to the identification one or more of anomalous interservice communication patterns 222, anomalous interservice network patterns 224, and anomalous interservice fault isolation and rerouting patterns 226. Meanwhile, the one or more generative machine-learning models 220 may be each individually trained and executed to monitor and identify the anomalous interservice communication patterns 222, the anomalous interservice network patterns 224, and the anomalous interservice fault isolation and rerouting patterns 226, respectively.

In other embodiments, the one or more generative machine-learning models 208 may be trained and executed to identify one or more of anomalous interservice communication patterns 222, anomalous interservice network patterns 224, and anomalous interservice fault isolation and rerouting patterns 226, and further trained and executed to dynamically update one or more of the microservices security operations process 210, the dynamic version control operations process 212, the dynamic network routing and fault rerouting operations process 214, and the patch execution and self-healing operations process 216 in response thereto. That is, the one or more generative machine-learning models 208 may be trained and executed to both identify the anomalous interservice interaction patterns 222, 224, and 226 and dynamically update the operations processes 210, 212, 214, and 216.

In particular embodiments, the one or more generative machine-learning models 208 may include one or more of a language model (LM), a large language model (LLM), a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, a generative pre-trained transformer (GPT) model, or other generative machine-learning model that may be suitable for identifying the anomalous interservice interaction patterns 222, 224, and 226 and dynamically updating the operations processes 210, 212, 214, and 216.

In particular embodiments, as further depicted by FIG. 2, the one or more generative machine-learning models 208 may be trained and executed to identify one or more anomalous interservice interaction patterns including, for example, anomalous communication patterns 222, anomalous interservice network patterns 224, and anomalous interservice fault isolation and rerouting patterns 226. In one embodiment, the anomalous communication patterns 222 may include, for example, one or more of a sudden increase in error rates, one or more high response times, a downtime of one or more microservices, one or more unauthorized user access attempts, one or more resource leaks or runaway operations processes, and one or more inconsistencies in microservice dependencies.

In one embodiment, the anomalous interservice network patterns 224 may include, for example, one or more of a network latency, a network data packet loss, a network traffic pattern, a network security, a network connectivity, a network configuration, a network protocol, and a network bandwidth usage. In one embodiment, the anomalous interservice fault isolation and rerouting patterns 226 may include, for example, one or more of a CPU, memory, and other computing resources usage, a network connectivity, a microservice availability, one or more software application logs, a load balancing and traffic distribution, one or more anomalies in performance metrics, a compute cluster health, and a resource utilization and capacity planning.

In particular embodiments, upon identifying the anomalous interservice interaction patterns 222, 224, and 226, the workflow of the intelligent microservices architecture and system 200 may continue with the one or more generative machine-learning models 208 dynamically updating the operations processes 210, 212, 214, and 216 associated with one or more microservices of the microservices architecture 206. Specifically, in particular embodiments, the one or more generative machine-learning models 208 may dynamically update one or more of the microservices security operations process 210, the dynamic version control operations process 212, the dynamic network routing and fault rerouting operations process 214, and the patch execution and self-healing operations process 216 in response to the identification of one or more of the anomalous interservice interaction patterns 222, 224, and 226.

In particular embodiments, the microservices security operations process 210 may include any operations processes suitable for fortifying security measures of the microservices architecture 206 to better safeguard against potential cyberthreats or other system vulnerabilities. In particular embodiments, the dynamic version control operations process 212 may include any operations processes suitable for seamlessly managing and controlling changes or updates across multiple iterations of the number of microservices of the microservices architecture 206, thus ensuring a structured and controlled environment for version transitions and updates of each of the number of microservices.

In particular embodiments, the dynamic network routing and fault rerouting operations process 214 may include any operation processes suitable for adapting data traffic flow in response to real-time or near real-time conditions and performance metrics, and thus allow for optimized interservice data transfer and enhanced operational agility within the microservices architecture 206. In particular embodiments, the dynamic network routing and fault rerouting operations process 214 may further include certain operations processes suitable for efficiently redirecting data traffic to alternative active or optimal data routes, and thus effectively maintains operational continuity and minimizes disruptions in service with respect to responding to the one or more client requests 202. In particular embodiments, the patch execution and self-healing operations process 216 may include any operations processes suitable for autonomously detecting and resolving issues present within the microservices architecture 206, and thereby bolsters overall functionality and reduces manual intervention with respect to any of the microservices of the microservices architecture 206.

In particular embodiments, the workflow of the intelligent microservices architecture and system 200 may then conclude with initiating the execution of one or more interactions with the microservices of the microservices architecture 206 for satisfying the one or more client requests 202. For example, in one embodiment, the execution of the one or more interactions with the microservices of the microservices architecture 206 may include execute a predetermined action for satisfying the one or more client requests 202. For example, a predetermined action for satisfying the one or more client requests 202 may include an accessing and viewing of sensitive user profile data 155, a transferring of data units between different sensitive user profiles, an application for opening one or more new sensitive user profiles, a third-party profile linking of a sensitive user profile to a third-party user profile associated with the same user 102, an instantiating of a new or an updated physical card or virtual card that may be associated with a user 102 sensitive user profile, or other predetermined action that may be performed utilizing the microservices of the microservices architecture 206 to appropriately satisfy the one or more client requests 202.

Accordingly, the present embodiments improve the security, reliability, maintainability, and responsiveness of microservices architectures 206, microservices or software applications 151, and sensitive user profile data 155, as well as the one or more processors 142 and memory 150 on which the microservices architectures 206, microservices or software applications 151, and sensitive user profile data 155 may be executed and stored by providing an intelligent microservices architecture and system 200 that utilizes one or more generative machine-learning models 208 (e.g., generative artificial intelligence (AI) models) trained and executed to identify anomalous interservice interaction patterns 222, 224, and 226 and dynamically update operations processes 210, 212, 214, and 216 based thereon.

That is, the intelligent microservices architecture and system 200 may intelligently orchestrate, manage, and control interactions between microservices of the microservices architecture 206 by identifying anomalous interservice interaction patterns 222, 224, and 226 between different microservices and dynamically updating operations processes (e.g., one or more of the microservices security operations process 210, the dynamic version control operations process 212, the dynamic network routing and fault rerouting operations process 214, or the patch execution and self-healing operations process 216) associated with the different microservices as appropriate. In this way, the present embodiments reduce execution time, latency, and processing workloads of the one or more processors 142 hosting the microservices architectures 206, increase microservices architecture 206 security, and increase network efficiency by enhancing interservice interactions and reducing the potential for version incompatibility and system faults.

Figure 3:
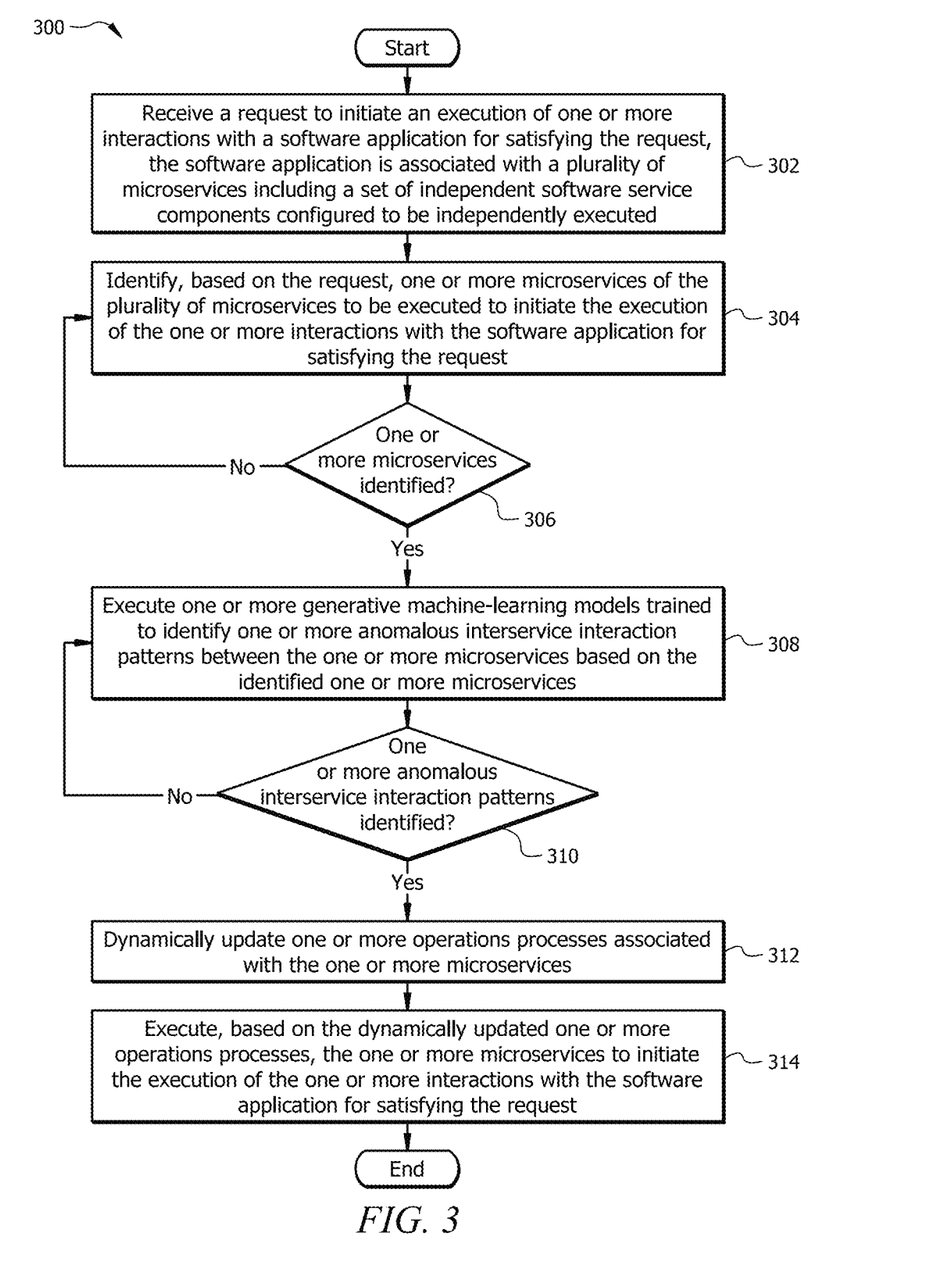
FIG. 3 illustrates a flowchart of an example method for securing and optimizing software application based microservices architectures, in accordance with one or more embodiments of the present disclosure.

FIG. 3 illustrates a flowchart of an example method 300 for securing and optimizing software application based microservices architectures, in accordance with one or more embodiments of the present disclosure. The method 300 may be performed utilizing the first computing system 140 as described above with respect to FIG. 1. The method 300 may begin at block 302 with the first computing system 140 receiving a request to initiate an execution of one or more interactions with a software application for satisfying the request, in which the software application is associated with a plurality of microservices including a set of independent software service components configured to be independently executed. For example, in one embodiment, the intelligent microservices architecture and system 200 may receive one or more client requests 202 that may be passed to one or more gateways 204 (e.g., API gateways), which may then route the one or more client requests 202 to one or more microservices of the microservices architecture 206 for satisfying the one or more client requests 202.

In particular embodiments, the method 300 may then continue at block 304 with the first computing system 140 identifying, based on the request, one or more microservices of the plurality of microservices to be executed to initiate the execution of the one or more interactions with the software application for satisfying the request. For example, in particular embodiments, the one or more gateways 204 (e.g., API gateways) may receive the one or more client requests 202 and may then call one or more microservices of the microservices architecture 206 identified as being suitable for satisfying the one or more client requests 202. In particular embodiments, the method 300 may then continue at decision 306 with the first computing system 140 confirming whether the one or more microservices has been identified.

For example, in response to determining that the one or more microservices has not been identified, the method 300 may return to block 304 as discussed above. On the other hand, in response to determining that the one or more microservices has been identified, the method 300 may then continue at block 308 with the first computing system 140 executing one or more generative machine-learning models trained to identify one or more anomalous interservice interaction patterns between the one or more microservices based on the identified one or more microservices.

For example, in particular embodiments, the one or more generative machine-learning models 208, 220 may identify one or more of an anomalous interservice communication pattern, an anomalous interservice versioning pattern, an anomalous interservice network latency pattern, an anomalous interservice data integrity pattern, an anomalous interservice logging pattern, an anomalous interservice dependency pattern, or an anomalous interservice fault isolation pattern between each of the microservices of the microservices architecture 206. The method 300 may then at decision 310 with the first computing system 140 determining whether the one or more anomalous interservice interaction patterns has been identified.

In particular embodiments, in response to determining that the one or more anomalous interservice interaction patterns has not been identified, the method 300 may return to block 308 as discussed above. On the other hand, in response to determining that the one or more anomalous interservice interaction patterns has been identified, the method 300 may then continue at block 312 with the first computing system 140 dynamically updating one or more operations processes associated with the one or more microservices. For example, in particular embodiments, the one or more generative machine-learning models 208, 220 may dynamically update one or more of a microservices security operations process 210, a dynamic version control operations process 212, a dynamic network routing operations process 214, a patch execution and self-healing operations process 216, a system fault isolation and rerouting operations process, or other operations process that may be suitable for improving and optimizing the security, reliability, maintainability, and responsiveness of the microservices architecture 206 by continuously monitoring and dynamically updating microservice interactions and operation processes to improve and optimize system performance and operational efficiency of the microservices architecture 206.

In particular embodiments, the method 300 may then conclude at block 314 with the first computing system 140 executing, based on the dynamically updated one or more operations processes, the one or more microservices to initiate the execution of the one or more interactions with the software application for satisfying the request. For example, in one embodiment, the first computing system 140 may execute the one or more microservices of the microservices architecture 206 to initiate the execution of the one or more interactions with the software application 151 to execute a predetermined action for satisfying the one or more client requests 202.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system, comprising:
a memory configured to store a software application and a plurality of microservices associated with the software application, wherein the plurality of microservices comprises a set of independent software service components of the software application configured to be independently executed; and
one or more processors operably coupled to the memory and configured to:
receive, from a computing device, a request to initiate an execution of one or more interactions with the software application for satisfying the request;
identify, based at least in part on the request, one or more microservices of the plurality of microservices to be executed to initiate the execution of the one or more interactions with the software application for satisfying the request;
execute one or more generative machine-learning models trained to identify one or more anomalous interservice interaction patterns between the identified one or more microservices based at least in part on the identified one or more microservices;

in response to identifying the one or more anomalous interservice interaction patterns between the one or more microservices, dynamically update one or more operations processes associated with the identified one or more microservices; and execute, based at least in part on the dynamically updated one or more operations processes, the identified one or more microservices to initiate the execution of the one or more interactions with the software application for satisfying the request.

2. The system of claim 1, wherein the one or more processors are further configured to dynamically update the one or more operations processes by dynamically updating one or more of a microservices security operations process, a dynamic version control operations process, a dynamic network routing operations process, a patch execution and self-healing operations process, or a system fault routing operations process.

3. The system of claim 1, wherein the one or more processors are further configured to execute the one or more generative machine-learning models further trained to identify one or more anomalous interservice interaction patterns between each of the plurality of microservices.

4. The system of claim 1, wherein the one or more anomalous interservice interaction patterns comprises one or more of an anomalous interservice communication pattern, an anomalous interservice versioning pattern, an anomalous interservice network latency pattern, an anomalous interservice data integrity pattern, an anomalous interservice logging pattern, an anomalous interservice dependency pattern, or an anomalous interservice fault isolation and rerouting pattern.

5. The system of claim 1, wherein the plurality of microservices comprises an authentication service, a tracing service, a monitoring service, a logging service, user profile service, a trading service, a data synchronization service, a backup service, a configuration service, a notification service, a reconciliation service, a reporting service, an interaction execution service, technical support service, and a third-party application programming interface (API) service.

6. The system of claim 1, wherein the one or more generative machine-learning model comprises one or more of a language model (LM), a large language model (LLM), a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, or a generative pre-trained transformer (GPT) model.

7. The system of claim 1, wherein the one or more processors are further configured to execute the one or more microservices to initiate the execution of the one or more interactions with the software application to execute a predetermined action for satisfying the request.

8. A method, comprising:
receiving, from a computing device, a request to initiate an execution of one or more interactions with a software application for satisfying the request, wherein the software application is associated with a plurality of microservices, and wherein the plurality of microservices comprises a set of independent software service components of the software application configured to be independently executed;

identifying, based at least in part on the request, one or more microservices of the plurality of microservices to be executed to initiate the execution of the one or more interactions with the software application for satisfying the request;

executing one or more generative machine-learning models trained to identify one or more anomalous interservice interaction patterns between the identified one or more microservices based at least in part on the identified one or more microservices;

in response to identifying the one or more anomalous interservice interaction patterns between the identified one or more microservices, dynamically updating one or more operations processes associated with the identified one or more microservices; and executing, based at least in part on the dynamically updated one or more operations processes, the identified one or more microservices to initiate the execution of the one or more interactions with the software application for satisfying the request.

9. The method of claim 8, wherein dynamically updating the one or more operations processes comprises dynamically updating one or more of a microservices security operations process, a dynamic version control operations process, a dynamic network routing operations process, a patch execution and self-healing operations process, or a system fault routing operations process.

10. The method of claim 8, further comprising executing the one or more generative machine-learning models further trained to identify one or more anomalous interservice interaction patterns between each of the plurality of microservices.

11. The method of claim 8, wherein the one or more anomalous interservice interaction patterns comprises one or more of an anomalous interservice communication pattern, an anomalous interservice versioning pattern, an anomalous interservice network latency pattern, an anomalous interservice data integrity pattern, an anomalous interservice logging pattern, an anomalous interservice dependency pattern, or an anomalous interservice fault isolation and rerouting pattern.

12. The method of claim 8, wherein the plurality of microservices comprises an authentication service, a tracing service, a monitoring service, a logging service, user profile service, a trading service, a data synchronization service, a backup service, a configuration service, a notification service, a reconciliation service, a reporting service, an interaction execution service, technical support service, and a third-party application programming interface (API) service.

13. The method of claim 8, wherein the one or more generative machine-learning model comprises one or more of a language model (LM), a large language model (LLM), a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, or a generative pre-trained transformer (GPT) model.

14. The method of claim 8, wherein executing the one or more microservices to initiate the execution of the one or more interactions further comprises executing the one or more microservices to execute a predetermined action for satisfying the request.

15. A non-transitory computer-readable medium storing instructions that, when executed by one or more processors, cause the one or more processors to:
- receive, from a computing device, a request to initiate an execution of one or more interactions with a software application for satisfying the request, wherein the software application is associated with a plurality of microservices, and wherein the plurality of microservices comprises a set of independent software service components of the software application configured to be independently executed;
- identify, based at least in part on the request, one or more microservices of the plurality of microservices to be executed to initiate the execution of the one or more interactions with the software application for satisfying the request;
- execute one or more generative machine-learning models trained to identify one or more anomalous interservice interaction patterns between the one or more microservices based at least in part on the identified one or more microservices;
- in response to identifying the one or more anomalous interservice interaction patterns between the identified one or more microservices, dynamically update one or more operations processes associated with the identified one or more microservices; and
- execute, based at least in part on the dynamically updated one or more operations processes, the identified one or more microservices to initiate the execution of the one or more interactions with the software application for satisfying the request.

16. The non-transitory computer-readable medium of claim 15, wherein the instructions further cause the one or more processors to dynamically update the one or more operations processes by dynamically updating one or more of a microservices security operations process, a dynamic version control operations process, a dynamic network routing operations process, a patch execution and self-healing operations process, or a system fault routing operations process.

17. The non-transitory computer-readable medium of claim 15, wherein the instructions further cause the one or more processors to execute the one or more generative machine-learning models further trained to identify one or more anomalous interservice interaction patterns between each of the plurality of microservices.

18. The non-transitory computer-readable medium of claim 15, wherein the one or more anomalous interservice interaction patterns comprises one or more of an anomalous interservice communication pattern, an anomalous interservice versioning pattern, an anomalous interservice network latency pattern, an anomalous interservice data integrity pattern, an anomalous interservice logging pattern, an anomalous interservice dependency pattern, or an anomalous interservice fault isolation and rerouting pattern.

19. The non-transitory computer-readable medium of claim 15, wherein the plurality of microservices comprises an authentication service, a tracing service, a monitoring service, a logging service, user profile service, a trading service, a data synchronization service, a backup service, a configuration service, a notification service, a reconciliation service, a reporting service, an interaction execution service, technical support service, and a third-party application programming interface (API) service.

20. The non-transitory computer-readable medium of claim 15, wherein the one or more generative machine-learning model comprises one or more of a language model (LM), a large language model (LLM), a bidirectional and auto-regressive transformer (BART) model, a bidirectional encoder representations for transformer (BERT) model, a knowledge enhanced bidirectional encoder representations for transformer (KnowBERT) model, a code bidirectional encoder representations for transformer (CodeBERT) model, or a generative pre-trained transformer (GPT) model.

* * * * *